United States Patent
Gaumer, Jr. et al.

[11] Patent Number: 5,154,062
[45] Date of Patent: Oct. 13, 1992

[54] CONTINUOUS PROCESS FOR PRODUCING SLUSH HYDROGEN

[75] Inventors: Lee S. Gaumer, Jr.; Robert B. Moore; Glenn E. Kinard, all of Allentown, Pa.

[73] Assignee: Air Products and Chemicals, Inc., Allentown, Pa.

[21] Appl. No.: 733,047

[22] Filed: Jul. 19, 1991

[51] Int. Cl.⁵ .............................................. F17C 5/00
[52] U.S. Cl. ........................................ 62/54.1; 62/68
[58] Field of Search ........................ 62/10, 12, 54.1, 68

[56] References Cited

U.S. PATENT DOCUMENTS

| | | | |
|---|---|---|---|
| 3,455,117 | 7/1969 | Prelowski | 62/54.1 |
| 3,521,457 | 7/1970 | Hemstreet | 62/54.1 |
| 3,521,458 | 7/1970 | Huibers et al. | 62/54.1 |
| 4,009,013 | 2/1977 | Schrawer et al. | |

OTHER PUBLICATIONS

R. Schrawer, "Production and Transport of Hydrogen Slush" Research Report T-72-22 (1974).

Primary Examiner—Ronald C. Capossela
Attorney, Agent, or Firm—Russell L. Brewer; James C. Simmons; William F. Marsh

[57] ABSTRACT

This invention relates to a continuous process for the preparation of slush hydrogen by the freeze-thaw technique. The process comprises substantially continuously injecting liquid hydrogen at or near its triple point temperature into a slush hydrogen generator; forming solid hydrogen by removing hydrogen vapor from the slush hydrogen generator; alternately adjusting the pressure in the slush hydrogen generator to a pressure below the triple point of hydrogen and then to a pressure slightly above the pressure at the triple point thereby effecting formation and dispersion of solids in said slush; concentrating the crystalline solid particles in the slush to a level of at least 30%, and preferably from 45 to 60%, by weight; and substantially continuously removing the slush hydrogen from said slush hydrogen generator at a rate such that a substantially constant level of slush is maintained in said slush hydrogen generator.

7 Claims, 2 Drawing Sheets

5,154,062

CONTINUOUS PROCESS FOR PRODUCING SLUSH HYDROGEN

FIELD OF THE INVENTION

This invention pertains to a process for producing slush hydrogen by the freeze-thaw technique.

BACKGROUND OF THE INVENTION

Slush hydrogen comprises a mixture of liquid hydrogen and solid hydrogen at hydrogen's triple point of 13.8° K. and 52.8 torr. Slush hydrogen has significant advantages to Normal Boiling Point (NBP) hydrogen, which refers to liquid hydrogen having a boiling point of 20.2° K. at 760 torr, these advantages being increased density and increased heat absorption capacity before vaporization relative to NBP liquid hydrogen. Similarly to NBP liquid hydrogen, slush hydrogen has good flow properties which makes it easily transportable. These advantages make it particularly suitable as a fuel source and coolant in aircraft.

Processes have been developed to produce slush hydrogen and some are referred to as the Auger-type, magnetic refrigeration, freeze-thaw, nozzle expansion and pumping-down. By and large each of these processes has been a batch process and there have been few reported cases of a continuous process for producing slush hydrogen by any of the above processes.

Representative prior art for producing slush hydrogen is noted in R. Schrawer, *Production and Transport of Hydrogen Slush* Research Report T 75-22 (1974) published for the Federal Ministry for Research and Technology (West Germany). The process most favorably employed was based on a combination of processes and the process incorporated the pumping-down process and the nozzle expansion process. In that process liquid hydrogen at its normal boiling point at ambient pressure is transported through a siphon line into a nozzle, expanded and injected into a vessel. Solid hydrogen is formed at the nozzle and is dispersed into the vessel. A vacuum pump is used to reduce the pressure in the vessel and draw off incoming saturated vapor thereby causing additional cooling and solid hydrogen formation. Schrawer points out that the pumping-down process is inherently reversible and supplies a higher slush yield than the irreversible nozzle process which incorporates isenthalpic throttling. The advantage of isenthalpic throttling is that the process lends itself to continuous slush production although no process was disclosed.

U.S. Pat. No. 4,009,013 discloses a variation in the processes described in the technical report above and pertains to the production of fine grained slush. In preparing slush having good transportation properties, solid particles in the slush are kept as small as possible. One problem associated with the pumping-down or pumping-off process is that solids develop which have a surface crystalline structure. To obtain finely grained slush for transportation it is necessary to destroy the crystalline surface solid, this usually being done by stirring. A finely grained slush is obtained in accordance with the patent by expanding high pressure liquefied gas through a nozzle into a chamber ultimately to a pressure below the pressure of the triple point in the gas-solid range and then to a pressure above the pressure of the triple point in the gas-liquid range. The cycling of pressure causes intermittent freezing and thawing of the surface hydrogen. Intermittent freezing coupled with agitation results in finely grained slush production.

SUMMARY OF THE INVENTION

This invention relates to a continuous process for the preparation of slush hydrogen by the freeze-thaw technique. The process comprises substantially continuously injecting liquid hydrogen at or near its triple point temperature into a slush-hydrogen generator; cooling the liquid hydrogen slush by removing hydrogen vapor from the generator; alternately adjusting the pressure in the slush generator to a pressure below the triple point of hydrogen and then to a pressure slightly above the pressure at the triple point thereby effecting condensation of hydrogen on the crystalline surface of solid particles present in said slush; concentrating the crystalline solid particles in the slush to a level of at least 30%, and typically from 45 to 60%, by weight; and substantially continuously removing the slush-hydrogen from said slush generator at a rate such that a substantially constant level of slush is maintained in said slush generator.

Advantages of the process include:
an ability to produce quality slush hydrogen in large quantities on a continuous basis;
an ability to produce slush hydrogen at excellent rates;
an ability to produce slush hydrogen with ease of control and with enhanced energy efficiency; and
an ability to produce high density slush in a slush hydrogen generator without a substantial aging period.

DRAWING

DETAILED DESCRIPTION OF THE INVENTION

Figure 1:
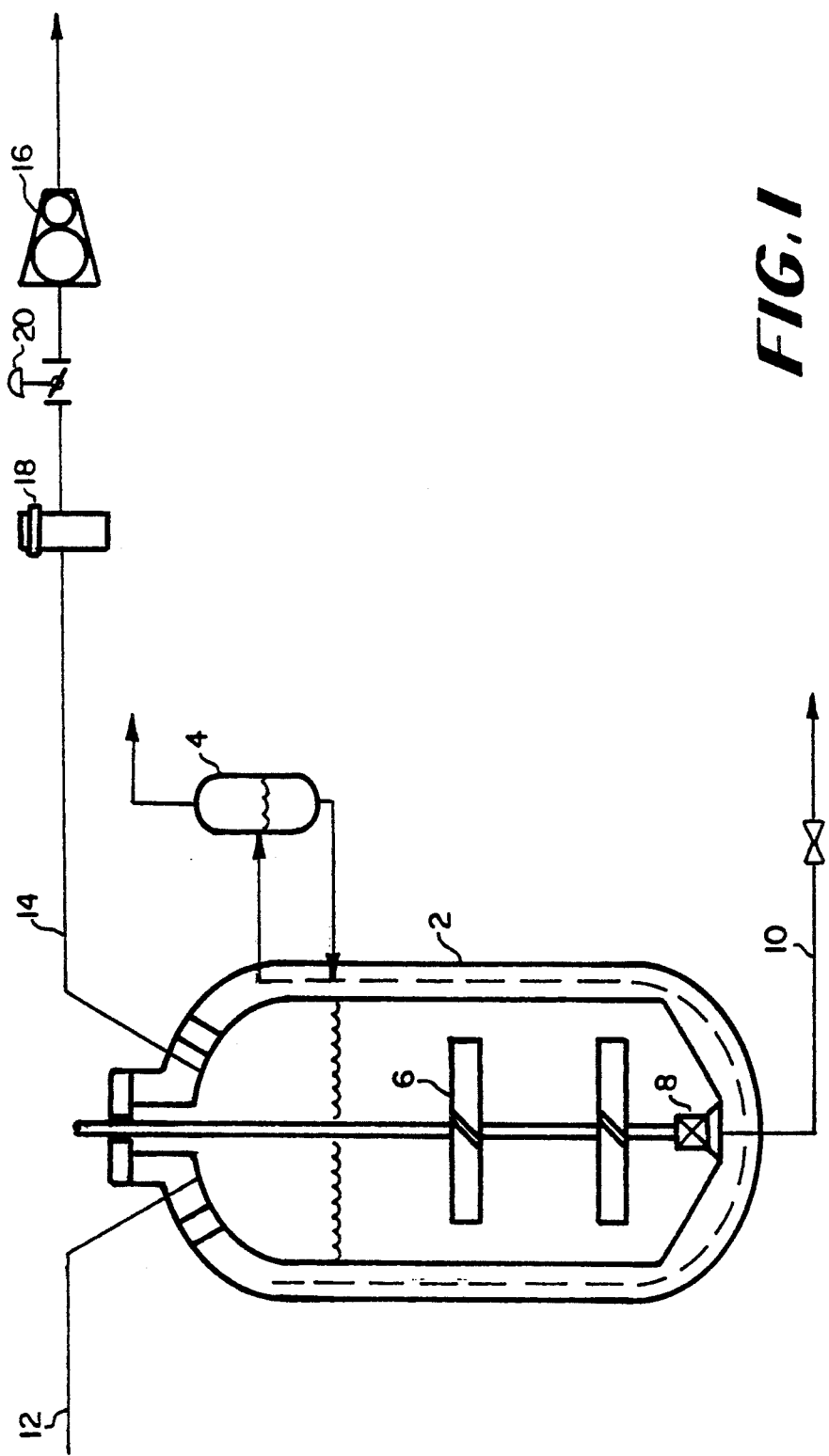
FIG. 1 is a diagram for a slush-hydrogen generator used in the continuous freeze-thaw process.

Referring to FIG. 1, there is shown a slush hydrogen generator 2 which is a jacketed vessel equipped for circulating liquid nitrogen or other refrigerant therein to intercept a portion of the heat in leakage. The jacketed vessel is shown equipped for circulation of liquid nitrogen through a heat intercept shield as a refrigerant via a separator 4 wherein liquid from the bottom of the separator is injected into the shield, circulated and gaseous nitrogen returned. Slush hydrogen generator 2 is equipped with agitation means 6 which includes two sets of agitator blades subsurface to the slush level. A primary purpose of agitation is to enhance dispersion of surface solid as it is formed. A wiper 8 is located near the bottom portion of slush hydrogen generator 2 to keep the solids fluid at the bottom and at slush removal line 10. Slush hydrogen generator 2 is equipped with an inlet line 12 for the introduction of liquid hydrogen which is at or near the triple point temperature. It is also equipped with a vapor outlet line 14 by which evaporative cooling of the liquid hydrogen in the slush hydrogen generator 2 is maintained.

Hydrogen vapor is removed from the slush hydrogen generator 2 by means of a system comprising a vacuum pump 16, a preheater 18 and a throttling valve 20. Hydrogen vapor is preheated in preheater 18 to maintain operability of the throttling valve and vacuum pump system. Throttling valve 20 is essentially timer controlled to oscillate from an open to closed position and permits the adjustment of pressure to a pressure below and above the triple point pressure within the slush hydrogen generator 2. Vacuum pump 16 is rated for process operation and is capable of reducing the pressure to below the triple point pressure in slush hydrogen generator 2.

In the continuous production of slush hydrogen by the freeze-thaw process, throttling valve 20 is employed to cycle the pressure within the slush hydrogen generator 2 above and below the triple point pressure in order to produce solid hydrogen at the surface. Pressure oscillation of approximately ±10% of the triple point pressure, e.g. 45–56 torr, is conducted for periods ranging from about 2 to 15 seconds, and generally from 6–15 seconds per cycle. As the pressure in slush hydrogen generator 2 is reduced below the triple point pressure, a loose matrix of hydrogen crystals forms at the surface. As the pressure rises slightly above the triple point pressure, the solids slide down into the liquid. This process is continued until the solids level in the slush reaches at least 30% and preferably at least 45% to 60% below which level hydrogen crystals remain subsurface in the liquid hydrogen. Above about 55% solids, some of the solid hydrogen particles are above surface and there is an associated loss of efficiency in the process.

Quite unexpectedly, slush densities greater than 30%, and typically from 45 to 60%, can be achieved with little difficulty in slush hydrogen generator 2 by operating the slush hydrogen generator in the continuous mode. In contrast, slush densities higher than 30% are difficult to achieve with the freeze-thaw process when operating in the batch mode. Aging, which simply requires holding the batch under vacuum without cycling pressure, is required to increase the slush density to a level of 50%. Such aging process reduces throughput in the slush hydrogen generator.

Figure 2:
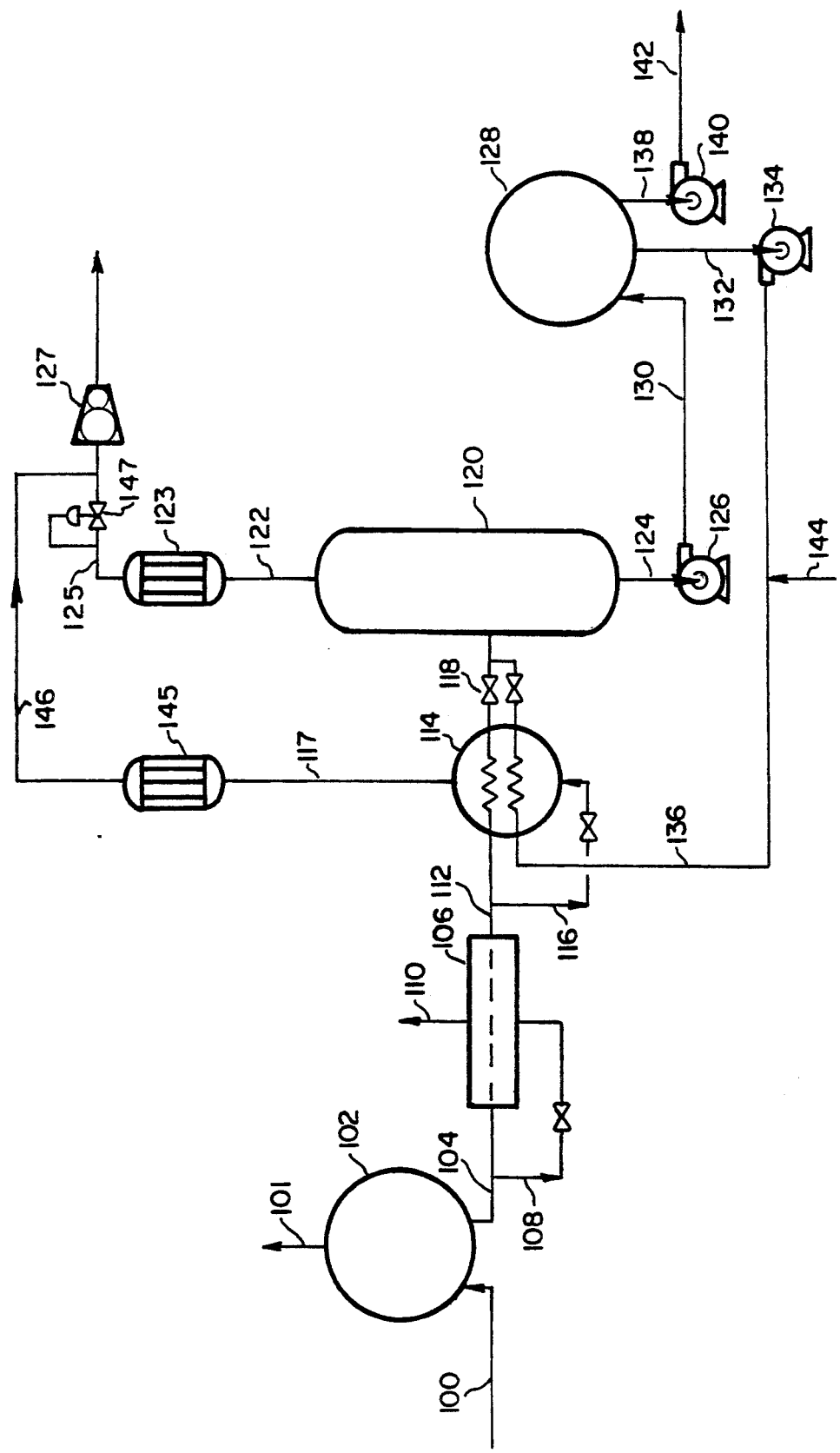
FIG. 2 represents a schematic diagram for a continuous process for producing slush hydrogen from NBP hydrogen including storage.

FIG. 2 is a flow diagram for the continuous production of slush hydrogen from a source of normal boiling point (NBP) liquid hydrogen to the storage of the slush hydrogen produced. More particularly, liquid hydrogen from a source such as tank truck, etc., is charged via line 100 to NBP hydrogen storage tank 102. NBP hydrogen at this point should have an ortho/para ratio of 5/95 at this point or lower.

NBP hydrogen having a 5/95 ortho/para ratio is removed via line 104 from NBP hydrogen vessel 102 and passed to an ortho/para catalytic converter 106 wherein the hydrogen is converted typically from 5/95 to 1/99 or less ortho/para by catalytic means. Catalytic converter 106 contains a catalyst such as nickel silicate which facilitates the conversion of the hydrogen from the higher energy level of the ortho form to the lower energy level exhibited by the para form. Although conversion of the ortho hydrogen to para hydrogen can be accomplished by temperature reduction without catalytic conversion, the catalytic approach facilitates the conversion and enhances efficiency of the process. Even though a catalytic approach is used, some cooling is required in the catalytic converter and a portion of hydrogen from line 104 is removed via line 108, expanded and passed through converter 106 prior to exhaust via line 110.

NBP hydrogen preferably having at least 99% in the para form is removed from catalytic converter 106 via line 112 and introduced to heat exchanger 114. In heat exchanger 114 the NBP hydrogen is cooled to its triple point temperature of 13.8° K. or at least to a temperature close to its triple point temperature. Refrigeration for heat exchanger 114 is obtained by removing a portion of the liquid hydrogen from line 112 via line 116 wherein it is expanded and passed in indirect heat exchange with inlet NBP liquid hydrogen. The vapor is withdrawn via line 117, preheated in preheater 145 and then passed through line 146 (back pressure valve not shown) to the suction side of vacuum pump 127 and downstream of pressure control valve 147. The liquid hydrogen at or near its triple point is removed from heat exchanger 114 via line 118 and expanded to essentially its triple point pressure for introduction to slush hydrogen generator 120. Vapor is removed from slush hydrogen generator 120 via line 122 preheated in preheater 123 and the preheated hydrogen removed via line 125 through pressure control valve 147 to vacuum pump 127. Slush hydrogen having a concentration of solids of at least about 30%, and typically from 45 to 60% by weight, is removed via line 124. The slush is pumped generally on a continuous basis via pump 126 to slush aging and storage tank 128 via line 130. The solids are concentrated typically from the 30–60% solids from the slush hydrogen generator 120 to a concentration of 45–65% in the storage tank 128.

Aging and concentration of solids in storage tank 128 may be effected by withdrawing triple point liquid hydrogen via line 132 in the tank. Upstream from removal line 132 and pump 134 is a screen (not shown) which acts to filter the solid particles from the triple point liquid hydrogen as it is removed from slush tank 128. Filtration of solid particles aids in concentrating solids in the remaining liquid. This triple point liquid hydrogen is conveyed via removal line 136 for recycle to heat exchanger 114 for introduction back to slush hydrogen generator 120. Slush hydrogen product is removed via line 138 from the bottom of slush tank 128 and pumped via pump 140 and line 142 for use in aircraft or other purposes. Triple point liquid hydrogen may be returned from the service aircraft for recycle and conversion to slush hydrogen by means of line 144.

The following example illustrates a preferred embodiment of the invention and is not intended to restrict the scope thereof.

EXAMPLE 1

A series of slush hydrogen flow tests were generated in a facility having a slush hydrogen generator configuration similar to that shown schematically in FIG. 1. The slush-hydrogen generator was 32" in diameter and 96" deep and it contained an agitation system, circulation pump and instrumentation for measurement of pressure and temperatures. Slush production was effected within an inner shell of the slush-hydrogen generator which had a capacity of about 100 gallons. The stirring device had an air driven motor and consisted of two sets of four hydrodynamic shaped blades which were maintained at two upper levels and two smaller blade set near the bottom of the vessel.

The slush withdrawal pump provided was a centrifugal type pump with an inducer and had a capacity of about 100 gallons per minute with a 5.5 psi differential pressure rise. The flow meter used was a Venturi type and pressure differentials were measured between the pump inlet and discharge and between the pump discharge and Venturi throat. Slush and liquid hydrogen density was measured using nuclear radiation attenuation (NRA) densimeters. These densimeters use an external 1 curie cesium source and scintillation counter.

The unit was located such that the beam was projected diametrically through the lower portion of the slush hydrogen generator above the top of the pump motor. Another densimeter was maintained in the transfer line from the slush hydrogen generator and consists of a ½ curie cesium source and scintillation counter.

Table 2 below sets forth results for continuous hydrogen production.

TABLE 2

Continuous Process for Producing Slush Hydrogen

| POINT | QUALITY | FLOW, lbs/hr | TEMP. °K. | PRESSURE PSIA | ENTHALPY BTUs/LB MOLE |
|---|---|---|---|---|---|
| 100 | NBPL | 880 | 20.3 | 14.7 | −222 |
| 101 | NBPV | 4 | 20.3 | 14.7 | — |
| 104 | NBPL | 876 | 20.3 | 14.7 | −222 |
| 108 | NBPL | 58 | 20.3 | 14.7 | −222 |
| 110 | NBPV | 58 | 20.3 | 14.7 | −222 |
| 112 | NBPL | 818 | 20.3 | 13.7 | −222 |
| 116 | L | 100 | 20.3 | 13.7 | −222 |
| 117 | TPV | 100 | 13.8 | 1.02 | 121.5 |
| 118 | TPL | 718 | 14.5 | 11.7 | −263.5 |
| 122 | TPV | 134 | 13.8 | 1.02 | 121.5 |
| 124 | 35% SL | 1727 | 13.8 | 1.02 | −285 |
| 125 | V | 234 | 275 | .85 | — |
| 132 | TPL | 893 | 13.8 | 1.02 | −267 |
| 136 | L | 1143 | 13.8 | 1.02 | −267 |
| 138 | SL 50% | VARIABLE | 13.8 | 1.02 | −267 |
| 144 | L | 250 | — | — | — |

NBPL refers to Normal Boiling Point Liquid Hydrogen.
NBPV refers to Normal boiling Point Hydrogen Vapor.
SL refers to a mixture of liquid and solid hydrogen; percent refers to solids concentration in the slush.
TPL refers to liquid hydrogen at its triple point temperature.
TPV refers to hydrogen vapor at its triple point temperature.
L refers to liquid hydrogen.

These tests demonstrated that the freeze-thaw process for production of slush hydrogen was capable of being operated as a continuous process and would produce slush quantities of 55 to 60 weight percent solids from triple point liquid hydrogen. These results were unexpected in that it was not heretofore conceived that 55 to 60 weight percent solids slush hydrogen would be produced directly from the freeze-thaw process in a continuous fashion without the need for aging the slush particles. Previous experiments in the batch mode had yielded slush of 30 to 40 weight percent solids and an aging time of many hours was required to approach 55 percent. The elimination of the aging time dramatically reduces the size of the equipment needed to produce the slush. This improvement is in addition to that achieved by running in the continuous rather than the batch mode. The plant size can be reduced by at least a factor of two when operating continuously to directly produce slush hydrogen.

What is claimed is:

1. In a process for producing slush hydrogen by the freeze-thaw method in a slush hydrogen generator, the improvement for producing slush hydrogen in high yield and on a continuous basis which comprises:
    (a) substantially continuously injecting liquid hydrogen at or near its triple point temperature into said slush hydrogen generator;
    (b) cooling the liquid hydrogen slush by removing hydrogen vapor from the slush hydrogen generator;
    (c) alternately cycling the pressure in the slush generator to a pressure below the triple point of hydrogen and then to a pressure slightly above the pressure at the triple point;
    (d) concentrating the solid particles in the slush to at least 30% by weight; and,
    (e) substantially continuously removing the slush hydrogen from said slush hydrogen generator at a rate such that a substantially constant level of slush is maintained in said slush hydrogen generator.

2. The process of claim 1 wherein the pressure is cycled and adjusted in step c) at a rate of 2 to 30 seconds per cycle.

3. The process of claim 2 wherein the solids are concentrated in said slush hydrogen generator to a level from 45 to 60% solids by weight.

4. A process for producing slush hydrogen from liquid hydrogen on a continuous basis which comprises:
    (a) continuously injecting normal boiling point liquid hydrogen having an ortho/para ratio of 5/95 or less but above 1/99 into a catalytic converter for conversion of said liquid hydrogen to liquid hydrogen having an ortho/para ratio of 1/99 or less;
    (b) cooling said liquid hydrogen to or near its triple point temperature;
    (c) expanding said liquid hydrogen to its triple point pressure;
    (d) injecting said liquid hydrogen into a slush hydrogen generator wherein hydrogen vapor is removed and said liquid hydrogen cooled sufficiently for forming solid hydrogen;
    (e) enhancing the rate of solid formation by cycling the pressure in the slush hydrogen generator to a pressure above the triple point pressure in the gas-liquid range to a pressure below the triple point pressure in the solid-liquid range at a rate of from 2 to 30 seconds per cycle;
    (f) concentrating the solid hydrogen in the slush hydrogen generator to a level of at least 30% but less than 55% by weight of the slush;
    (g) transferring the slush hydrogen to a storage vessel; and,
    (h) concentrating the solids in said slush contained in said storage vessel from to a level of from 45 to 65% by weight.

5. The process of claim 4 wherein the solids in said slush are concentrated in said storage vessel by filtering solids from the liquid hydrogen and the liquid hydrogen recycled to the slush generator.

6. The process of claim 5 wherein the solids in the slush are concentrated to a level of at least 60% in the storage tank.

7. The process of claim 4 wherein the pressure in said slush hydrogen generator is cycled at a rate of from 6–15 seconds per cycle.

* * * * *